Jan. 11, 1966 L. VADOT 3,228,465
HEAT EXCHANGER
Filed Feb. 8, 1961 3 Sheets-Sheet 1

INVENTOR.
LOUIS VADOT

BY

ATTORNEYS

Jan. 11, 1966  L. VADOT  3,228,465
HEAT EXCHANGER
Filed Feb. 8, 1961  3 Sheets-Sheet 2

INVENTOR.
LOUIS VADOT

ATTORNEYS

INVENTOR
LOUIS VADOT

# United States Patent Office 3,228,465
Patented Jan. 11, 1966

3,228,465
HEAT EXCHANGER
Louis Vadot, Grenoble, France, assignor to Societe Grenobloise d'Etudes et d'Applications Hydrauliques, Grenobie, France, a corporation of France
Filed Feb. 8, 1961, Ser. No. 87,928
Claims priority, application France, Nov. 21, 1960, 43,051
10 Claims. (Cl. 165—167)

The present invention relates to heat exchangers, and has for its principal object the provision of an improved heat exchanger apparatus that posses special advantages for the purpose of cooling and heating blood in hypothermia, though it can also be used to considerable advantage in other fields including, for example, the food industry.

The features which are embodied in the heat exchanger of this invention that render it superior as a device for changing the temperature of blood include the following:

It has low volumetric capacity.

The total area of the heat exchanging surface can be altered readily at will to suit the weight of the patient receiving the hypothermic treatment.

The pressure drop in the blood passed through the device is low and the blood flow therethrough is of the laminar type.

The prevention of bubbles forming in the blood passages of the device is easy and complete.

The sides of the blood passages in the device are non-hemolytic.

The device is designed for both cooling and heating and during reheating, there is no point in the system where the temperature of the blood exceeds the maximum compatible with physiological considerations.

There is no risk of the blood coming into contact with the cooling or heating fluid.

The device is easy to clean and sterilize.

In accordance with the invention, the heat exchanger herein is essentially composed of a set or series of identical heat exchanger plates arranged in stacked relation and separated in the stack by identical sealing plates designed to provide alternate and crosswise flows of blood and water between the heat exchanger plates. As thus arranged, each of the heat exchanger plates will have a laminar type of fluid passage formed on each side thereof, one of such passages being for the blood flow and the other of such passages being for the water flow. Each of the heat exchanger plates with its two associated blood and water passages to either side thereof, thus constitutes one heat exchanger element, it being understood that each of such associated passages is also common to one of the two adjacent parallelly arranged heat exchanger elements between the heat exchanger plates of which said one heat exchanger element is sandwiched in the stack. The blood passages are all connected together to provide a zig-zag flow of blood through the exchanger and such series of connected passageways is provided with its own inlet and outlet. In a similar fashion the water passages are all connected together to provide a zig-zag flow of water through the exchanger and such connected water passageways are provided with a separate inlet and outlet. Preferably all of the inlets and outlets are provided at one end of the exchanger to facilitate connection of the blood passages in by-pass relation to a patient and connection of the water passages to the source for warm or cold water.

The heat exchanger and seal plates are adjustably clamped together in properly stacked relation and so that the crosswise branches of the fluid passages therebetween are fluid-tight. Means are also provided to take care of leaks at those places in the fluid passages where the liquids are conducted directly through the plates and to avoid any possibility of the blood and water becoming mixed or the flow of blood being contaminated by the water.

It is believed that a better understanding of the heat exchanger of this invention, as well as the advantages and features of novelty thereof, will become more apparent from a perusal of the following description when read in connection with the accompanying drawings, in which.

Figure 1:
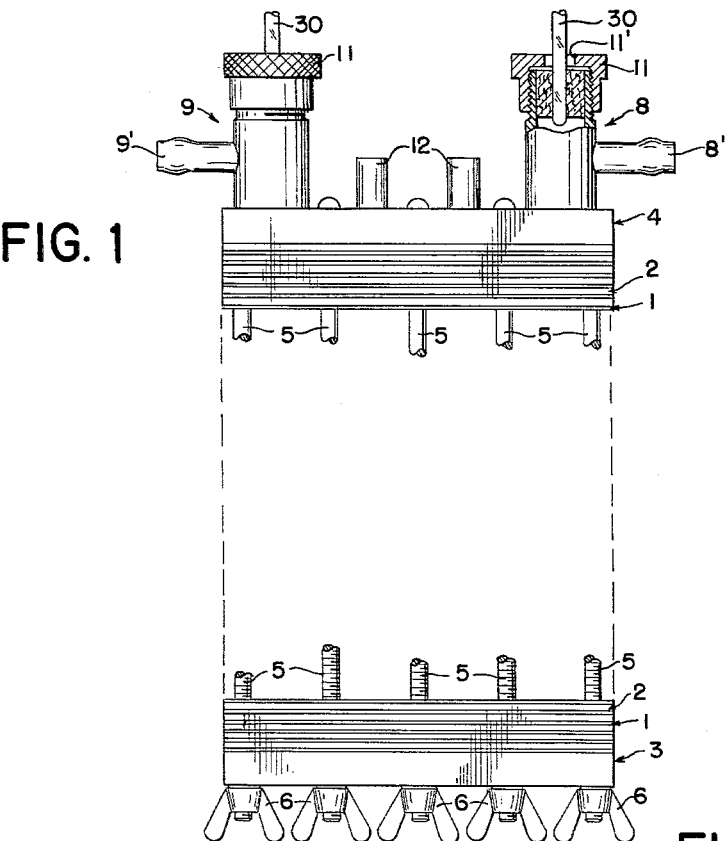
FIG. 1 is an elevational view of a heat exchanger embodying the invention herein.

In the drawings, the reference numeral 1 designates generally each of the heat exchanger plates which are alternately arranged in stacked relation with a plurality of seal plates 2 between a bottom cover plate 3 and a top cover plate 4. It will be noted that the heat exchanger plates 1 are sandwiched between the seal plates 2 so that the top and bottom plates in the stack of such plates are seal plates which therefore are adjacent to the cover plates 3 and 4. The number of plates 1 and 2 in the stack will depend upon the area of heat exchange surface that is desired for any particular patient. For example, if the device is to be used for an adult, the stack may include 80 plates 1 and 81 plates 2, whereas, if the device is to be used for a child as few as 5 plates 1 and 6 plates 2 may be sufficient.

The stack of plates 1 and 2 are clamped together between the bottom plate 3 and the top plate 4 with the aid of a plurality of tie rods 5, each of which extends through aligned openings in the plates 1, 2, 3 and 4, and is provided at its lower threaded end with a wing nut 6. In the device shown, there are provided sixteen tie rods 5 arranged symmetrically around the peripheral edge portion of the device for tightening the stack together under substantially uniform pressure.

Figure 2:
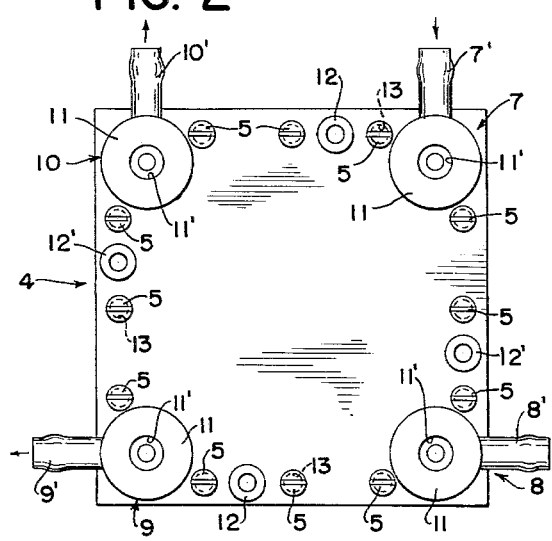
FIG. 2 is a top plan view of the heat exchanger shown in FIG. 1.

The sixteen openings which are provided in the top cover plate 4 for the tie rods are indicated in FIG. 2 by the reference numeral 13. In addition to these sixteen openings for the tie rods, the top plate 4 is provided with four relatively large fluid openings located in the corners thereof and four smaller fluid openings each positioned in a side edge portion of such plate adjacent to one of such larger openings. The large fluid openings of plate 4 are fitted with four unions 7, 8, 9 and 10 provided with adaptors 7', 8', 9' and 10' for connecting the device to the patient in by-pass relation and to a source of water for cooling or heating the blood of the patient passing through the device. The device is so connected to the patient that the withdrawn blood will enter the apparatus through the adaptor 7' of the union 7, will then pass through the apparatus to be cooled or heated, and will then come out at the diagonally opposed union 9, passing through the adaptor 9' thereof to be returned to the patient. The water for cooling or heating the blood passing through the apparatus will enter through the adaptor 8' of union 8 and leave at the adaptor 10' of the diagonally opposed union 10, after passing through the apparatus.

Each of the unions 7, 8, 9 and 10 is provided with a closure cap 11 having an opening 11' through which a temperature measuring probe 30 in FIG. 1 may be inserted to observe the temperatures of the entering and discharging fluids and thereby to enable the operator to properly adjust the flow of such fluids therethrough to establish the desired conditions in the exchanger.

The four smaller fluid openings in the top plate 4 are fitted with connectors 12 and 12' designed to detect and drain any leaks that may occur in the apparatus. It will be noted that the two oppositely disposed connectors 12, 12 are associated with the blood unions 7 and 9 and accordingly will function as drain outlets for blood leaking from the holes in the plates 1 and 2 aligned therewith, while the two oppositely disposed connectors 12', 12' are associated with the water unions 8 and 10 and will drain any water which may leak from the holes in the plates 1 and 2 aligned therewith.

Figure 3:
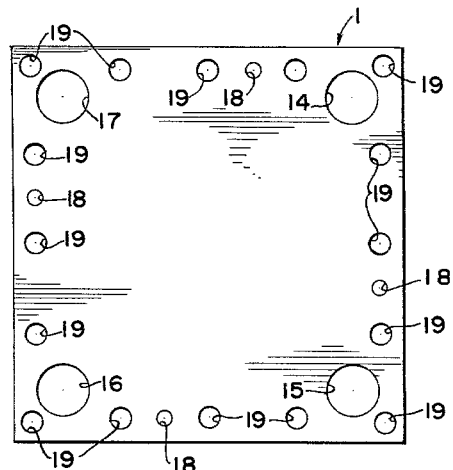
FIG. 3 is a plan view of one of the series of heat exchanger plates in the device of FIGS. 1 and 2.

As is shown more clearly in FIG. 3 of the drawings, each of the heat exchange plates 1, which are identical in construction, is composed of sixteen holes 19 which are aligned with the holes 13 in the cover plate 4 and through which the tie rods 5 extend, four large fluid holes 14, 15, 16 and 17 which are aligned with the openings in cover plate 4 in which are fitted the unions 7, 8, 9 and 10, respectively, and four smaller fluid holes 18 which are aligned with the holes in which are fitted the connectors 12 and 12'. Thus, the aligned larger, diagonally opposed, fluid holes 14 and 16 of the plates 1 which are aligned with the unions 7 and 9, respectively, constitute the main flow holes for the blood passing through the device, while the aligned larger, diagonally opposed, fluid holes 15 and 17 of the plates 1 which are aligned with the unions 8 and 10, respectively, constitute the main flow holes for the water being conducted through the device. Also the two smaller aligned fluid holes 18 of the plates 1 which are aligned with the two connectors 12 will function to drain off and carry away any blood that may be leaking from the main blood passageway of which the aligned holes 14 and 16 form a part, whereas the two smaller aligned fluid holes 18 of the plates 1 which are aligned with the two connectors 12' will take care of leaks in the main water passageway of which the aligned holes 15 and 17 form a part.

The plates 1 preferably are made of a suitable non-hemolytic material such as stainless steel. The plates are flat and may have any suitable exterior shape, but preferably are made square as shown for ease of assembly. As a result of such square shape the four holes 14, 15, 16 and 17 are equally spaced successively and the diagonal distance between holes 14 and 16, and 15 and 17 are the same. It will be noted also that the holes 18 and 19 in plates 1 are grouped with the holes 14, 15, 16 and 17 thereof into four similar arrangements or groups such that it will be readily apparent which is the top side of a plate 1 and so long as the plate is properly faced any group of such holes will properly align with any other group of such holes in the other plates 1.

The seal plates 2 with which the heat exchange plates 1 are alternately arranged in the stack are similar in exterior shape to the latter, i.e., square and are also flat plates though thicker than the heat exchange plates. For example, the heat exchange plates 1 may be made with a thickness of approximately 1/16 of an inch, while the seal plates 2 may be made with a thickness of approximately 15/16 of an inch. The seal plates 2 may be made of any suitable sealant material, but preferably are made of a material which will both provide a satisfactory seal and be non-hemolytic, such as, rubber.

Figure 4:
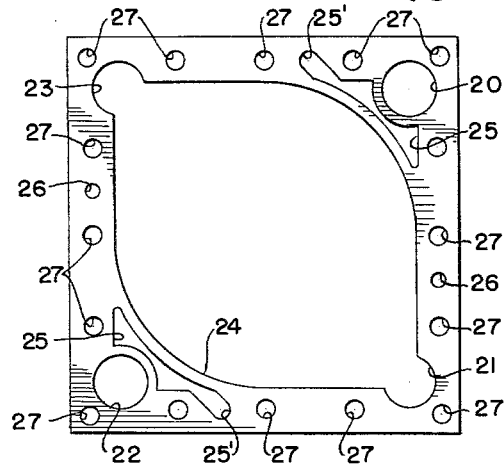
FIG. 4 is a plan view of one of the series of seal plates embodied in such device.

As will be seen more clearly in FIG. 4 of the drawings, each seal plate 2 is provided with two diagonally disposed, closed, fluid holes 20 and 22 which are spaced so that they may align with either the holes 14 and 16 or the holes 15 and 17 in the plates 1 depending upon the arrangement of the seal plate in the stack. As has been previously indicated, the series or successive seal plates in the stack are alternately arranged at 90° to each other so that one set of such plates 2 is arranged as shown in FIG. 4 with the holes 20, 22 thereof aligned with the holes 14, 16 of the plates 1 and the other set of such plates 2, which are in alternate relation with the plates 2 of said one set, is arranged so that the holes 20, 22 thereof are aligned with the holes 15, 17 of the plates 1. Thus, the holes 20, 22 of the one set of plates 2 are used to form part of the main passageway for the blood flow, while the holes 20, 22 of the other set of plates 2 will form part of the main passageway for the water flow.

Each seal plate 2 is also provided with two diagonally disposed, open, fluid holes 21, 23 which are spaced so that they may align with either the holes 15 and 17, or the holes 14 and 16 in the plates 1 depending upon the arrangement of the seal plate in the stack for the same reason as above explained with relation to the holes 20, 22 thereof. Also as in the case of holes 20, 22 of such plate, the fluid holes 21, 23 of alternating seal plates 2 will alternately form part of the passageways for the blood flow and the water flow. The holes 21, 23 of each seal plate are in communication with each other through a diagonally disposed opening 24, which together with the two plates 1 between which such seal plate is sandwiched, forms a passageway for the fluid between such holes 21 and 23. The opening 24 has any suitable shape which will provide a maximum exposure of the liquid passing therethrough to the opposed heat exchange surfaces of the associated plates 1, such as the oval shape shown in FIG. 4 and providing a large free area in the middle of plate 2.

Figure 5:
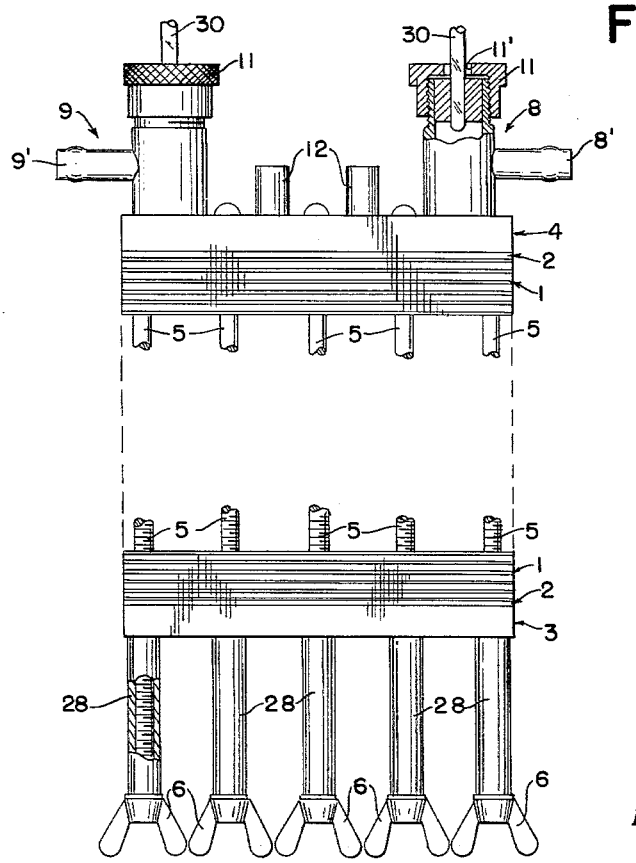
FIG. 5 is an elevational view of the device with a reduced number of heat exchangers and seal plates.
Figure 6:
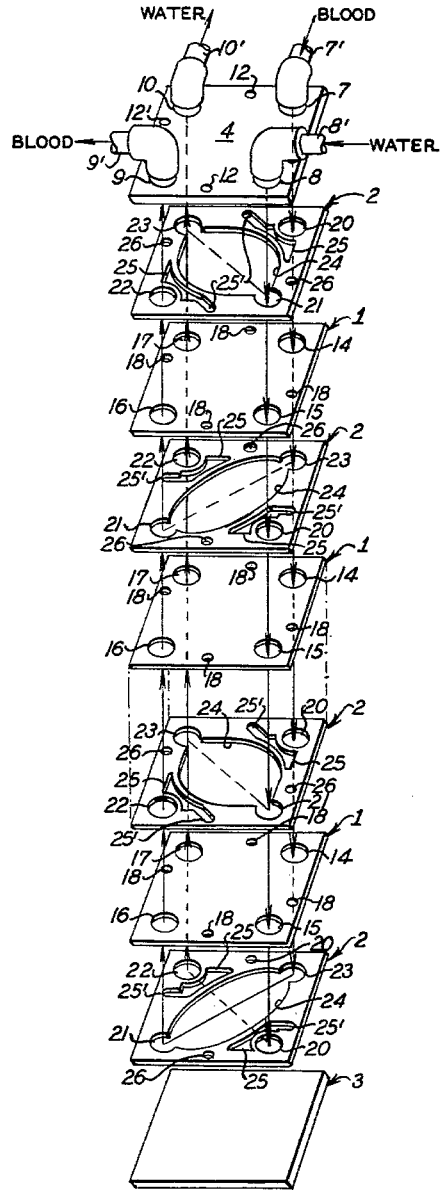
FIGURE 6 is an exploded view in perspective illustrating a series of heat exchange and seal plates separated to show the several fluid flow paths for the separate fluids in counter current relationship through the device.

It will be understood from the foregoing, that as the series of seal plates 2 are alternately arranged at 90° to each other in the stack so that the diagonal passageways formed between adjacent plates 1 by the openings 24 in such seal plates alternately form part of the blood and water passageways, there will be blood flowing in alternate spaces between the plates 1 with water flowing in a crosswise direction in the remaining spaces therebetween. It can thus be said that each heat exchange plate 1 with the passageways formed by the inner openings or spaces 24 of the seal plates 2 on either side of such heat exchange plate, forms a single heat exchange element. As previously indicated the number of these heat exchange elements in an apparatus may be varied to suit the heat exchange results desired. When the number of plates 1 and 2 have been considerably reduced for a particular operation so that substantial portions of the tie-rods 5 project below the bottom cover plate 3, spacer pieces 28, in FIG. 5, of considerable length may be assembled on the projecting ends of such tie-rods.

It will be noted that when in the holes 21, 23 and the connecting space 24 of a seal plate 2 in the apparatus, blood is flowing therethrough, water will be flowing through the holes 20, 22 thereof in an isolated condition from the central space 24. Vice versa, when water is flowing through the holes 21, 23 and the connecting central space 24 of a seal plate 2, blood will be flowing through the holes 20, 22 of such plate and be isolated from the central space 24 thereof. It is essential that these two fluids should not come into contact with each other, regardless of any difference that there may be in their pressures. Accordingly, there is provided in each seal plate 2 two narrow closed cut-outs 25 which are positioned between the holes 20, 22 and the central space 24. Each of the cut-outs 25 is formed so that an end portion 25' thereof communicates with two of the drain holes 18 in the plates 1 which form the drain passages for either the blood or the water. Thus, if the holes 20, 22 of a seal plate 2 conduct blood therethrough, the end portions 25' of the cut-outs 25 will communicate with the two aligned holes 18 in the plates 1 which lead to the drain outlets 12, 12 on the top cover 4. On the other hand, if the holes 20, 22 of a seal plate 2 conduct water through such plate, the cut-out end portions 25' will be in communication with the two diagonal holes 18 in the plates 1 which lead to the drain outlets 12', 12' on the top cover. This construction therefore assures that whatever the differences in the pressures of the blood and water may be, any leakage of either blood or water from the main flow holes 20 and 22 will be confined to the cut-outs 25 and the proper drain passages for such liquids. There is, therefore, no possibility of the blood coming into contact with the water.

The cut-outs 25 provide a further advantage in that they reduce the surface area of the seal plates 2 in the regions of the holes 20 and 22 and, therefore, make the seal plates more flexible in such regions. As a result of such construction, any deformation of the seal plates which might otherwise occur when the stack is clamped together, is avoided, whereby the possibility of leakage is reduced to a minimum.

Because of the cut-outs 25, the seal plates 2 are provided with only two drain holes 26 adjacent to the open liquid holes 21, 23 and located so as to become aligned with the two sets of aligned drain holes 18 in the plates 1 with which the cut-out portions 25' are not in communication. The plates 2 in addition are provided with sixteen holes 27 for the tie-rods to pass through such plates.

The lower cover 3 is a flat plate of suitable thickness and having sixteen holes around its edge so that the tie-rods 5 may extend therethrough to enable the wing nuts 6 to be attached to the projecting ends thereof. The cover 3 is not otherwise open and, therefore, functions as a closure for the bottom ends of the four aligned series of flow holes and the four aligned series of leak holes in the plates 1 and 2 and the top cover 4.

It is believed that it will be clear from the foregoing, that the heat exchanger of this invention is essentially constituted of a plurality of flat heat exchanger and seal plates which are readily assembled into stack form in such manner that there is a seal plate 2 between each pair of heat exchanger plates 1 and that each seal plate is positioned crosswise with respect to the next one in the stack, whereby the central free areas of the seal plates provided by the large openings 24 therein alternately communicate with two of the main blood flow holes and two of the main water flow holes in such a way that on the sides of each heat exchange plate 1 there is a flow of blood and a flow of water, the two flows being crosswise to each other.

Arranging the seal plates 2 properly in the aforesaid manner is a relatively easy operation since any seal plate that is wrongly positioned need only be rotated through 90° to bring it into proper arrangement if the plate is of square shape externally. In the case of seal plates which have a rectangular external shape, any incorrectly placed plate need only be turned over to bring it to proper position.

The plates 1 and 2 assembled as above are, as has been explained, secured together by means of the tie-rods 5, the bottom and top cover plates 3 and 4, respectively, and the wing nuts 6. The top plate 4 provides a suitable base for the assemblage of the four unions 7, 8, 9 and 10, which connect the four main flow passages formed by the holes 14, 15, 16 and 17 in the heat exchanger plates 1 and the holes 20, 21, 22 and 23 in the seal plates 2, with the external systems, and which are also constructed to provide temperature measurement tapping. The top plate 4 is also provided with the four outlets 12, 12, 12' and 12' which are connected to the four aligned series of leakage drain holes 18 and 26, and the cut-out portions 25', to permit the drainage to escape and to function as a means for detecting any leaks.

It is believed evident also that the aforesaid parts are easy to dismantle and that their simple construction makes for ease of cleaning and sterilization.

It is believed that the manner in which the exchanger functions to cool or reheat the blood passed therethrough will also be apparent from the foregoing. The size of the apparatus described in the example given herein is such that the exchange surface area of each heat exchanger plate 1 is approximately sixteen square inches. Depending on the flow velocity selected for the exchanger elements, the amount of heat exchanged will very between 2 and 5 kilogram calories per heat exchanger plate, per hour and per degree C. of temperature difference. Under such conditions, there is no difficulty in cooling a patient down from 37° C. to about 10° C. in a matter of some 15 to 20 minutes. As the volumetric capacity of the exchanger is low this rate can easily be varied, or the exchanger suited to the particular type of patient being treated by varying the number of heat exchanger plates 1 and seal plates 2. These plates can be readily added or removed from the apparatus for such purposes by removing the wing nuts 6 and threading the plates on or removing them from the bottom ends of the tie rods 5.

An advantage of the exchanger in accomplishing the aforesaid results is that the temperature of the blood in passing through the device will at no point exceed the limit dictated by physiological considerations. The pressure loss in the blood is small and as the blood flow through the device is in the main laminar, there is no risk of hemolysis occurring, as would be the case where the flow conditions are turbulent. The possibility of hemolysis occurring, as a result of the construction of the exchanger, is also eliminated because of the non-hemolytic nature of the materials which make up the passage walls therein. The formation of bubbles in the blood flow can be completely and very easily overcome by lying the exchanger down horizontally during filling so that the blood outlet union 9 is higher than the blood inlet union 7.

As has been indicated, any risk of the blood and water coming into contact with one another is avoided by the small narrow cut-aways 25 in the seal plates 2 between the inlet and outlet passages of one of the fluids and the central free area 24 where the other fluid is flowing. The cut-aways 25 connect to the atmosphere in such a way that any blood leakage and any water leakage is led away through individual passages, so that any mixing of blood and water is rendered impossible. Any leakage which might be observed at the beginning of an operation will provide a timely warning that the stack must be tightened up tighter to achieve proper sealing.

While a preferred embodiment and use of the invention has been hereinabove described and illustrated in the drawings, it will be apparent to those skilled in the art that the exchanger of this invention is not limited to the application of hypothermia described but can be used to advantage in a number of other fields, and that modifications may be made in the construction thereof without departing from the spirit of the invention or the scope of the appended claims.

I claim:

1. A heat exchanger composed of a plurality of flat heat exchanger plates and a plurality of flat seal plates arranged in alternate relation in stack form with the opposed facing surface portions thereof in engagement with each other, each of said plates having four flow holes, two of said flow holes being diagonally spaced and forming portions of feeding and return conduits for the passage straight through the exchanger of one liquid to be heat treated and two of said flow holes being diagonally spaced and forming portions of feeding and return conduits for the passage straight through the exchanger of another treating liquid, said heat exchanger plates being solid in the central areas thereof and said seal plates each defining an inner central opening of substantial area extending to and connecting one pair of the diagonally opposite flow holes thereof and extending between the other two diagonally opposite flow holes thereof so that each seal plate and the two adjacent heat exchanger plates in engagement with the opposite facing surfaces of said seal plate form between the latter a laminar passageway bringing said one pair of flow holes into communication with each other, and said seal plates being alternately arranged at such angle to each other that there is provided across the two faces of each heat exchanger plate a laminar flow of the one treated liquid and a laminar flow of the other treating liquid, the two laminar flows being crosswise to each other, the openings defined by said alternately arranged seal plates, and the feeding and return conduits formed by said flow holes, establishing within said plates a parallel laminar flow relation of the treated and treating liquids and in which such relation alternate laminar flows are disposed crosswise to the other laminar flows within the plates, and means for detachably connecting said heat exchanger plates and said seal plates in stacked relation.

2. A heat exchanger such as defined in claim 1, in which said heat exchanger and seal plates are made of non-hemolytic material and said seal plates are made of deformable sealant material.

3. A heat exchanger such as defined in claim 4, in which said heat exchanger plates are made of stainless steel and said seal plates are made of rubber.

4. A heat exchanger such as defined in claim 1, in which the inner central opening defined by each of said seal plates occupies a large part of the area of such plate so that the liquid conducted thereby between the opposite facing surfaces of such seal plate is exposed to a major portion of the solid central exchange surface area of the two associated heat exchanger plates between which such sealed plate is sandwiched.

5. A heat exchanger such as defined in claim 6, in which the inner central opening in each of said seal plates is of generally oval shape.

6. A heat exchanger such as defined in claim 1, including a bottom cover plate at the bottom of said stack of plates and a top cover plate at the top of said stack of plates, at least one of said cover plates being provided with four flow holes in alignment with the four flow holes in said heat exchanger and seal plates, at least one temperature measuring probe for measuring the temperature of the liquid conducted through at least one of the four flow holes in said cover plate, and means on said cover plate for supporting said measuring probe in temperature measuring position and for liquid sealing such probe in such position.

7. A heat exchanger such as defined in claim 1, in which said heat exchanger and seal plates are provided with an aligned series of leak holes extending through the height of the stack within the areas of such plates and being associated with each series of the four aligned flow holes thereof and defining a drainage passageway for liquid leaking from its associated series of flow holes, the two leak holes associated with the two diagonally opposite flow holes in each seal plate that are not connected by the central opening in such seal plate, being located between such unconnected flow holes and such central opening, and being larger than the other two leak holes in such seal plate and the leak holes in said heat exchanger plates, and including means for closing one end of each of such series so that any liquid entering the passageway defined by such series will drain toward the open other end thereof.

8. A heat exchanger such as defined in claim 7, including a cover plate at an end of said stack of plates and provided with four drain holes located at the open ends of and aligned with said series of leak holes, and a connector fitted in each of said cover drain holes for detecting and draining any leaking liquid entering its associated series of leak holes.

9. A heat exchanger such as defined in claim 1, in which said seal plates are each provided with narrow elongated openings separating the two diagonal flow holes thereof that are not in communication with said inner central opening thereof, from the latter, so as to prevent any leakage from said holes reaching the liquid flowing through said central opening, and including means for draining any leakage collected in said elongated openings through the height of the stack within the area of said plates.

10. A heat exchanger such as defined in claim 9 in which said draining means comprises an aligned series of leak holes provided within the areas of said heat exchanger and seal plates for each of the aligned series of elongated openings in said seal plates and being in communication with the latter so as to drain any leakage collected in said elongated openings through and toward one end of the stack.

References Cited by the Examiner
UNITED STATES PATENTS

| | | | |
|---|---|---|---|
| 1,916,395 | 7/1933 | Stamsvik | 165—10 X |
| 2,125,842 | 8/1938 | Eggleston. | |
| 2,582,871 | 1/1952 | Kinther | 165—70 |
| 2,616,671 | 11/1952 | Wakeman | 165—70 |
| 2,937,856 | 5/1960 | Thomson | 165—167 X |
| 2,939,686 | 6/1960 | Wildernuth | 165—167 |
| 2,991,161 | 7/1961 | Gasche | 165—11 X |
| 3,117,624 | 1/1964 | Wennerberg | 165—167 |

ROBERT A. O'LEARY, *Primary Examiner.*

HERBERT L. MARTIN, CHARLES SUKALO,
*Examiners.*